United States Patent [19]

Wheeler

[11] Patent Number: 4,933,850
[45] Date of Patent: Jun. 12, 1990

[54] CONTROL AND METHOD FOR CONTROLLING AMT SYSTEM INCLUDING MANUALLY OPERATED ENGINE COMPRESSION BRAKE

[75] Inventor: Robert S. Wheeler, Leyland, England

[73] Assignee: Eaton Corporation, Cleveland, Ohio

[21] Appl. No.: 121,380

[22] Filed: Nov. 16, 1987

[30] Foreign Application Priority Data

Dec. 5, 1986 [EP] European Pat. Off. ........ 86309478.5

[51] Int. Cl.$^5$ ...................... B60K 41/18; B60K 41/20; G05D 17/02
[52] U.S. Cl. .................................... 364/424.1; 74/866
[58] Field of Search ............... 364/424.1, 426.1, 426.2; 74/866; 192/7, 1.2, 1.21, 1.22, 4 A

[56] References Cited

U.S. PATENT DOCUMENTS

| | | | |
|---|---|---|---|
| 3,684,066 | 8/1972 | Kubo et al. | 74/866 |
| 4,081,065 | 3/1978 | Smyth et al. | 192/0.076 |
| 4,262,783 | 9/1981 | Scarrott et al. | 192/0.09 |
| 4,361,060 | 11/1982 | Smyth | 74/866 |
| 4,422,353 | 12/1983 | Suga | 74/866 |
| 4,507,986 | 4/1985 | Okamura | 74/866 |
| 4,527,447 | 7/1985 | Richards | 74/866 |
| 4,576,065 | 3/1986 | Speranza et al. | 74/866 |
| 4,680,992 | 7/1987 | Hayasaki et al. | 74/866 |
| 4,696,380 | 2/1989 | Kita | 192/44 |
| 4,698,763 | 10/1987 | Smyth | 364/424.1 |
| 4,702,127 | 10/1987 | Cote | 74/866 |
| 4,765,201 | 8/1988 | Ishiguro et al. | 74/866 |
| 4,771,657 | 9/1988 | Iwatsuki | 74/866 |

FOREIGN PATENT DOCUMENTS 38083 10/1981 European Pat. Off. .
0180916 5/1985 European Pat. Off. .

*Primary Examiner*—Felix D. Gruber
*Attorney, Agent, or Firm*—H. D. Gordon

[57] ABSTRACT

A method and control for controlling an AMT system (10) having an operator actuated engine compression brake (17) is provided including sensing vehicle deceleration and monitoring throttle position (THL), vehicle brake actuation (BRK) and engine compression brake (ECB) actuation to select one of three (50, 52, 54) mutually exclusive vehicle deceleration downshift shift profiles.

18 Claims, 5 Drawing Sheets

CONTROL AND METHOD FOR CONTROLLING AMT SYSTEM INCLUDING MANUALLY OPERATED ENGINE COMPRESSION BRAKE

BACKGROUND OF THE INVENTION

1. Field of the Invention

This invention relates to automatic/semiautomatic power transmissions providing a plurality of gear reduction ratios, such as automatic/semiautomatic mechanical transmissions (i.e. "AMTs"), and, to control systems and methods therefor. In particular, the present invention relates to control systems and methods for automatic/semiautomatic mechanical transmission systems wherein gear selection and shift decisions are made and/or executed based upon measured and/or calculated parameters such as vehicle or transmission output shaft speed, transmission input shaft speed, engine speed, throttle position, rate of change of throttle position, rate of change of vehicle and/or engine speed and the like. More particularly, the present invention relates to a control and method for controlling an AMT system including a manually operated engine compression brake during sensed vehicle deceleration by modifying the downshift logic in response to sensed throttle, vehicle brake and/or engine compression brake operation.

2. Description of the Prior Art

The use of automatic transmissions of both the automatic mechanical type utilizing positive clutches and of the planetary gear type utilizing frictional clutches is well known in the prior art as are control systems therefor. Electronic control systems utilizing discrete logic circuits and/or software controlled microprocessors for automatic transmissions wherein gear selection and shift decisions are made based upon certain measured and/or calculated parameters such as vehicle speed (or transmission output shaft speed), transmission input shaft speed, engine speed, rate of change of vehicle speed, rate of change of engine speed, throttle position, rate of change of throttle position, full depression of the throttle (i.e. "kickdown"), actuation of the braking mechanism, currently engaged gear ratio, and the like are known in the prior art. Examples of such automatic/semiautomatic transmission control systems for vehicles may be seen by reference to U.S. Pat. Nos. 4,361,060; 4,595,986; 4,576,065; 4,569,255; 4,551,802; 4,527,447; 4,425,620; 4,463,427; 4,081,065; 4,073,203; 4,253,348; 4,038,889; 4,226,295; 3,776,048; 4,208,929; 4,039,061; 3,974,720; 3,478,851 and 3,942,393, and European Pat. No. 0 071,353, the disclosures of which are all hereby incorporated by reference.

Automatic control systems/subsystems for automatically controlling the engagement and disengagement of AMT system vehicle master clutches, especially during vehicle start from stop operations, are known in the prior art as may be seen by reference to U.S. Pat. Nos. 4,081,065; 4,401,200; 4,413,714; 4,432,445, 4,509,625 and 4,576,263, the disclosures of all of which are hereby incorporated by reference.

While the above referenced automatic/semiautomatic transmission control systems, especially the system illustrated in U.S. Pat. Nos. 4,081,065; 4,361,060; 4,595,986; 4,576,065; 4,569,255 and 4,576,263, and similar systems, are effective to control the vehicle automatic/semiautomatic transmission system operations under most conditions, under certain vehicle deceleration conditions, the logic did not accurately sense vehicle operating conditions/operator intentions and some downshifts were performed in other than the most desirable manner.

SUMMARY OF THE INVENTION

In accordance with the present invention, the drawbacks of the prior art have been overcome or minimized by providing a control system, preferably an electronic control system, and control method for automatic/semiautomatic mechanical transmission systems wherein gear selection and shift decisions, especially vehicle deceleration downshift decisions, are made and/or executed based upon measured and/or calculated parameters including at least input signals indicative of engine speed, throttle position, vehicle speed, operation of the vehicle brakes and operation of the vehicle engine compression brake. Other inputs/parameters, such as signals indicative of the transmission input shaft speed, rate of change of throttle position, condition of the master clutch, currently engaged gear ratio, and the like, may also be utilized to make decision for control of the AMT system. The various input signals are processed to provide downshift logic rules whereby the AMT system will perform transmission downshifts in a manner most suited for vehicle operating conditions.

The above is accomplished by providing a transmission control system including a central processing unit generating shift patterns (i.e., shift points) based upon sensed or calculated parameters processed by a central processing unit in accordance with predetermined logic rules or programs. The predetermined logic rules or programs by which the various input signals are processed include a method for detecting or predicting at least four distinct vehicle deceleration operating conditions. These vehicle deceleration operating conditions include a coasting condition wherein the vehicle operator is allowing the vehicle to decelerate at a relatively low rate determined by road conditions and vehicle inertia, a moderate braking condition wherein the vehicle is decelerated at a relatively moderate rate by the operator's application of the vehicle brakes only, a maximum braking condition wherein the operator is applying the vehicle brakes and the engine compression brake to achieve a maximum available vehicle deceleration rate, and a vehicle performance required condition wherein the vehicle is decelerating while the operator is maintaining the throttle control at greater than a predetermined reference value.

In both the maximum braking condition and the performance required condition of vehicle deceleration, it is highly desirable that the transmission be downshifted such that, after completion of the downshift, the engine speed will be at a relatively maximum value, such as the governed engine speed, to provide maximum performance and for maximum engine compression braking. In the coasting mode of operation, it is desirable that the transmission be downshifted at relatively low engine speed such that, after the downshift, the engine speed will be at a relatively low value allowing smooth deceleration of the vehicle to continue. In the moderate braking condition, it is desirable that the transmission be downshifted at engine speeds such &hat, after completion of the downshift, the engine speed will provide a degree of engine compression for retarding motion of the vehicle, but will not be unduly harsh to provide an objectionably rough ride for the vehicle operator and/or to provide a sudden deceleration of the vehicle which may be dangerous to those vehicles following the vehicle in which the AMT system is installed.

The above is accomplished by providing predetermined logic rules or programs by which the above discussed vehicle deceleration operating conditions can be sensed and/or predicted. The central processing unit receives signals indicative of vehicle speed, throttle position, engine compression brake actuation, and vehicle brake actuation. If, during deceleration of the vehicle, either throttle position exceeds a predetermined reference value and/or the engine compression brake is actuated, the logic declares a performance/maximum braking condition and the downshift shift profiles are set to provide downshifting at engine speeds which, assuming relatively constant speed during the shift transient, will resolve in the engine speed being at a maximum value upon completion of the downshift. It, during vehicle deceleration conditions, throttle position does not exceed the predetermined reference value and the engine compression brake is not actuated while the vehicle brakes are actuated, the logic declares a moderate vehicle braking condition and the downshift shift profiles are set to provide a moderately high engine RPM upon completion of transmission downshifting. If, during vehicle deceleration, throttle position fails to exceed the predetermined reference value, and both the engine compression brake and the vehicle brakes are not actuated, the logic declares a vehicle coasting condition and downshift shift point profiles are selected to provide a relatively low engine speed upon completion of downshifting.

Accordingly, it is an object of the present invention to provide a new and improved control and control method for an automatic/semi-automatic mechanical transmission system including a manually operated engine compression brake which senses and/or predicts various types of vehicle deceleration operating conditions and modifies the downshift shift profiles accordingly.

This and other objects and advantages of the present invention will become apparent from a reading of the description of the preferred embodiment taken in connection with the attached drawings.

DESCRIPTION OF THE PREFERRED EMBODIMENT

Figure 1:
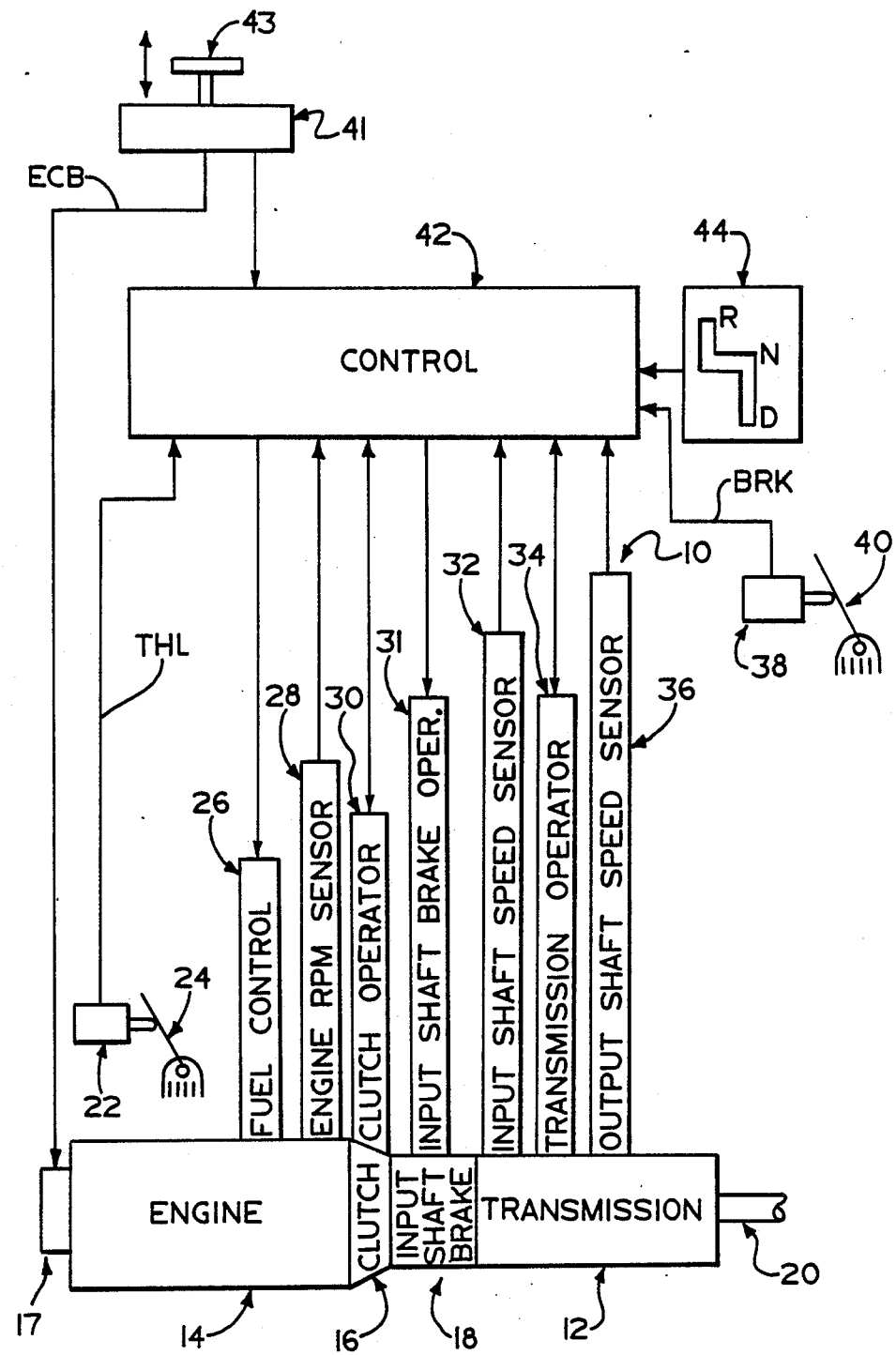
FIG. 1 is a schematic illustration of the components and interconnections of the automatic mechanical transmission control system of the present invention.

FIG. 1 schematically illustrates an automatic mechanical transmission system 10 including an automatic multi-speed compound change gear transmission 12 driven by a throttle control engine 14, such as a well known diesel engine, through a master friction clutch 16. An engine compression brake, such as an exhaust brake 17, for retarding the rotation speed of engine 14 and/or an input shaft brake 18, which is effective to apply a retarding force to the transmission input shaft upon disengagement of master clutch 16, may be provided as is well known in the art. The output of automatic transmission 12 is output shaft 20 which is adapted for driving connection to an appropriate vehicle component such as the differential of a drive axle, a transfer case, or the like, as is well known in the prior art.

Exhaust brakes, also known as engine compression brakes, such as the well known "Jake Brake" are well known in the heavy-duty truck industry.

The above-mentioned power train components are acted upon and/or monitored by several devices, each of which will be discussed in greater detail below. These devices include a throttle position or throttle opening monitor assembly 22, which senses the position of the operator control vehicle throttle or other fuel throttling device 24, a fuel control device 26 for controlling the amount of fuel to be supplied to the engine 14, an engine speed sensor 28 which senses the rotational speed of the engine 14, a clutch operator 30 which engages and disengages clutch 16, and which may also supply information as to the status of the clutch, an input shaft brake operator 31, a transmission operator 34, which is effective to shift the transmission 12 into a selected gear ratio and preferably to provide a signal indicative of the currently engaged ratio, and a transmission output shaft speed sensor 36. A vehicle brake monitor 38 senses actuation of the vehicle brake pedal 40 while an engine compression brake monitor 41 senses actuation of the engine compression brake actuator 43.

The above-mentioned devices supply information to and/or except commands from a central processing unit or control 42. The central processing unit 42 may include analog and/or digital electronic calculation and logic circuitry, the specific configuration and structure of which circuitry forms no part of the present invention. The central processing unit 42 also receives information from a shift control assembly 44 by which the vehicle operator may select a reverse (R), neutral (N), or forward drive (D) mode of operation of the vehicle. An electrical power source (not shown) and/or source of pressurized fluid (not shown) provide electrical and/or pneumatic power to the various sensing, operating and/or processing units. Drive train components and controls therefor of the type described above are known in the prior art and may be appreciated in greater detail by reference to above-mentioned U.S. Pat. Nos. 4,595,986; 4,576,065; 4,569,255; 4,361,060; 4,226,295; 4,038,889 and 3,776,048.

Sensors 22, 28, 32, 36, 38, 41 and 44 may be of any known type or construction for generating analog or digital signals proportional to and/or indicative of the parameter monitored thereby. Similarly, operators 17, 18, 26, 30 and 34 may be of any known electrical, pneumatic or electro-pneumatic type for executing operations in response to command signals on processing unit 42. Fuel control 26 will normally supply fuel to engine 14 in accordance with the operator setting of throttle 24, but may supply a lessor (fuel dip) or greater (fuel boost) amount of fuel in accordance with commands from control unit 42.

In addition to the above-mentioned direct inputs, the central processing unit 42 may be provided with circuitry and/or logic routines for differentiating the input signals from sensors 28 and/or 36 to provide calculated signals indicative of the rate of acceleration of the engine and/or vehicle, means to compare the input signals from sensors 31 and 36 to calculate a currently engaged gear ratio, means to compare the current engaged gear ratio with the signal from sensor 36 to provide a calculated engine speed, means to sense full throttle and means to differentiate the signal from sensor 22 to calculate the rate of change of the throttle position sensor.

The central processing unit 42 may also comprise a memory means for storing certain input and/or calculated information and means for clearing the memory means upon the occurrence of a predetermined event. The memory means incorporated into the central processing unit 42 may store information such as the direction of the last shift (i.e. upshift or downshift), position of a throttle, rate of change of throttle position, vehicle speed or the like. The memory means may be reset upon the occurrence of a specified event, such as engine or vehicle speed being less than and of greater than a predetermined limit or limits, full application of a throttle, operator throttle setting exceeding a predetermined limit, the occurrence of a gear change, etc.

It is understood that, given a known drive train, output speed and vehicle speed are related in a known manner. Also, assuming a fully engaged master clutch 16, input shaft speed and engine speed are equal and signals indicating any two of the input shaft/engine speed, currently engaged gear ratio and output shaft/vehicle speed is sufficient to specify all three parameters.

The purpose of the central processing unit 42 is to select, in accordance with a program (i.e. predetermined logic rules) and current and stored parameters, the optimal gear ratio at which the transmission 12 should be operating and, if necessary, to command a gear change, or shift, into the selected optimal gear ratio. Ideally, decisions by the central processing unit 42 as to the proper gear ratio that should be selected and engaged, are based upon accurate sensing and/or predicting of current operating conditions and driver demands.

Figure 3:
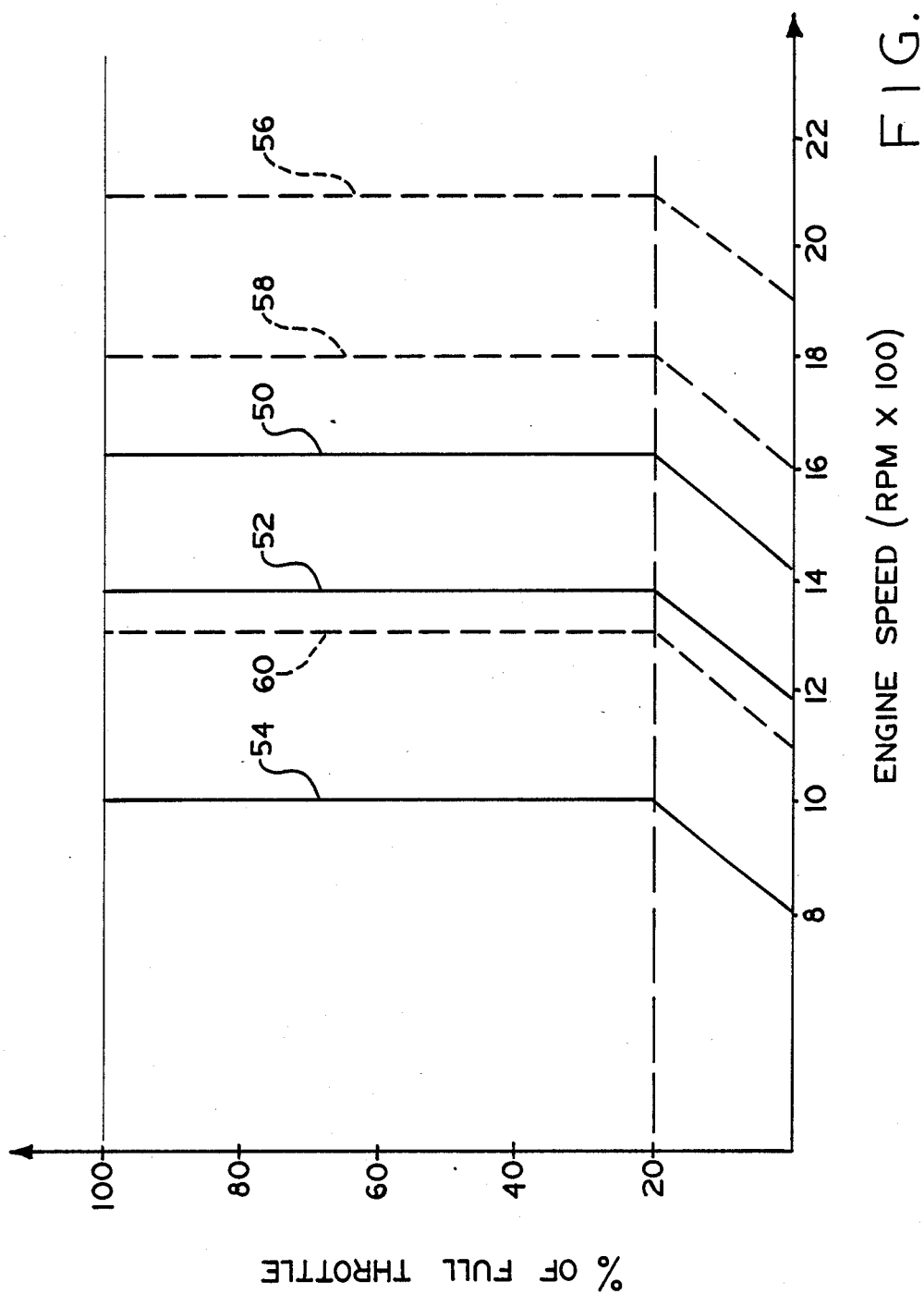
FIG. 3 is a symbolic illustration, in the form of a graph illustrating the downshift shift patterns or shift point profiles, of the present invention.

One of the primary purposes of the central processing units programs or logic rules is to generate shift patterns, or shift point profiles. FIG. 3 illustrates only the three vehicle deceleration downshift shift profiles 50, 52 and 54 of the present invention. The shift point profiles generated by the central processing unit will determine if the transmission should remain in the currently engaged ratio, should be upshifted to the next highest ratio, or should be downshifted to the next lower ratio. In certain situations, multiple upshifts or downshifts may be selected. The shift point profiles graphically illustrated in FIG. 3 are a function above throttle position, expressed as a percentage of maximum throttling position, and of engine speed. Downshifts occur if the operating point moves to the left of the active downshift shift point profile. The engine speed may be directly sensed or, preferably, as calculated engine speed which will not vary during a shift transient, as is known in the prior art. As is well known, assuming a relatively constant vehicle speed during a shift transient, the engine speed, upon completion of a downshift, will be greater than the engine speed prior to the downshift, by a factor of the ratio step. Accordingly, the greater the engine speed at which downshifts are commanded, the greater the engine speed upon completion of the downshift.

Referring to FIG. 3 and assuming a transmission ratio step of about 28% to 32% for transmission 12, dashed line 56, 58 and 60 represent the expected engine speeds at completion of downshifts performed accordance with downshift shift profiles 50, 52 and 54, respectively. Assuming engine 14 to be a diesel engine having a maximum governed speed of about 2100 RPM, as represented by line 62, downshifting in accordance with downshift shift profile 50, will provide maximum engine performance and/or maximum engine compression braking, downshifting in accordance with downshift shift profile 52 will provide a more moderate, less harsh, engine compression braking while downshifting in accordance with downshift shift profile 54 provide relatively little, if any, engine compression braking. Accordingly, upon sensing the vehicle deceleration operating conditions indicating a need for vehicle performance and/or maximum vehicle braking, it is desirable that the logic utilized downshift shift profile 50, upon sensing a vehicle coasting condition, that the logic utilize the downshift shift profile 54 and upon sensing a moderate vehicle braking condition, that the logic utilize the downshift shift profile 52.

Figure 2A:
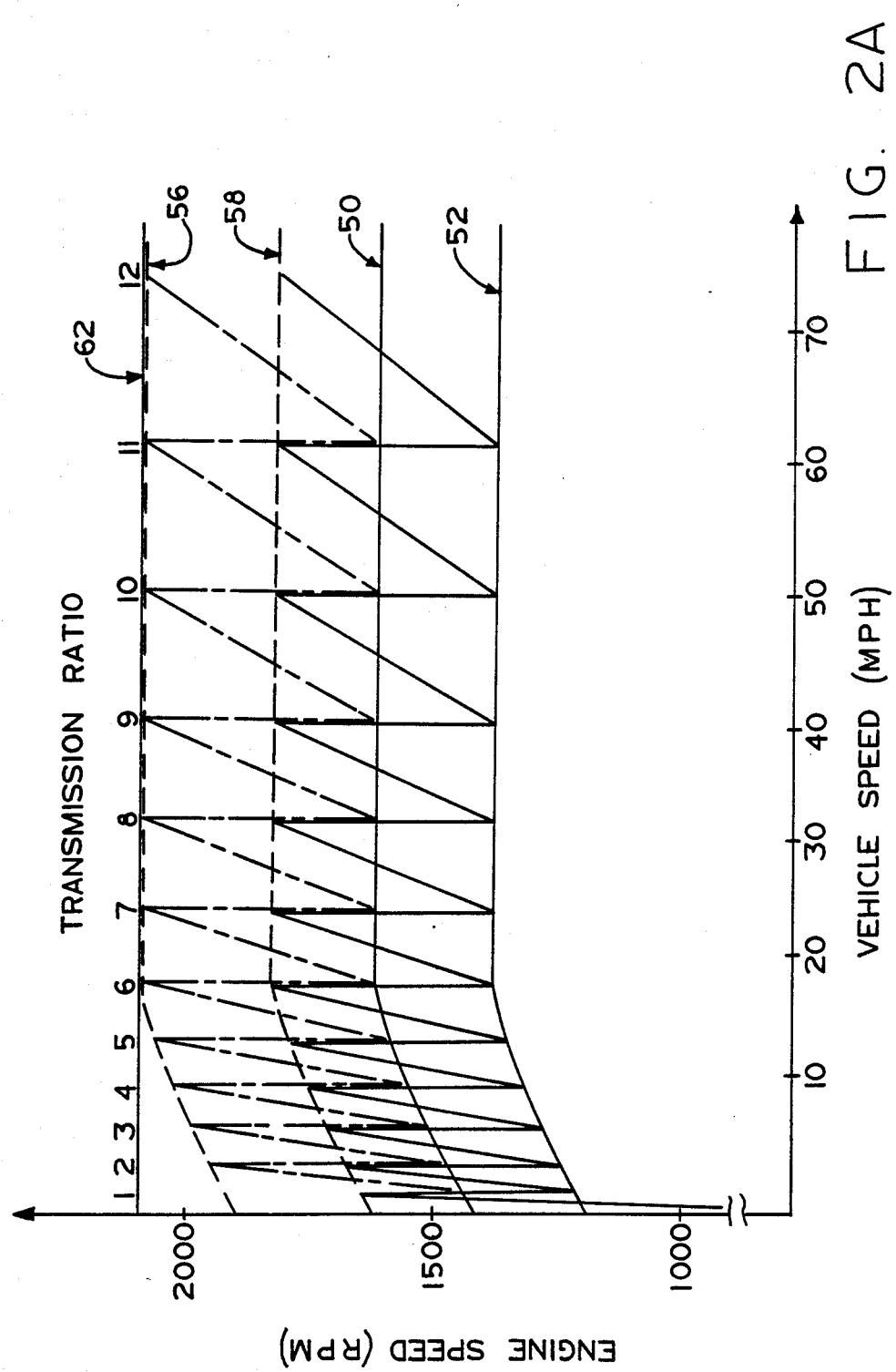
FIGS. 2A and 2B are symbolic illustrations, in the form of downshift speed charts, illustrating the preferred manner of practicing the present invention.
Figure 2B:
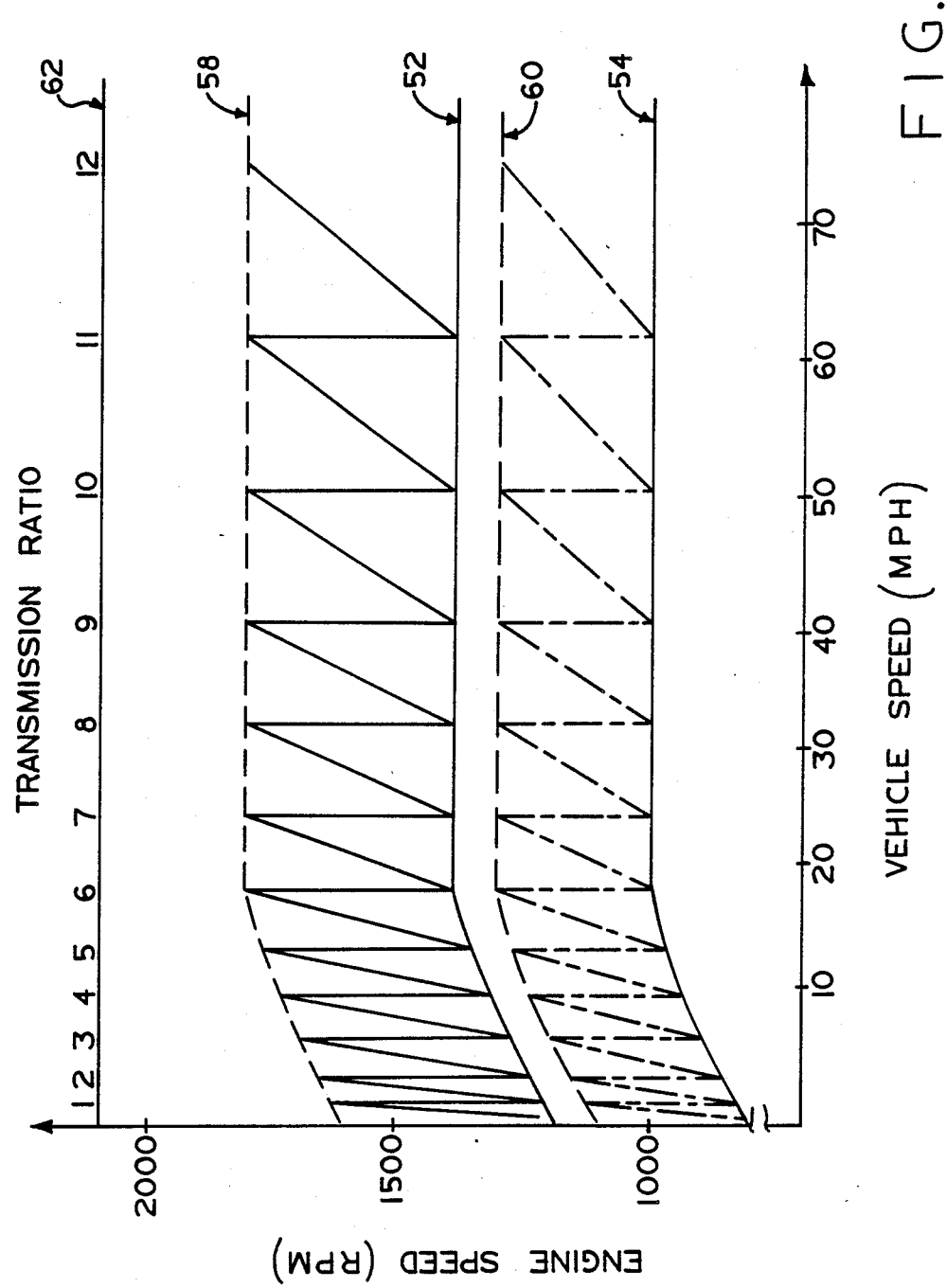

Assuming, for purposes of illustration, that transmission 12 is a twelve forward speed transmission having substantially equal ratio steps of about 30% and that engine 12 is a diesel engine governed to a maximum engine rotational speed of 2100 RPM, the relative consequences of selecting vehicle deceleration shift point profiles 50, 52 or 54 may be seen be reference to FIGS. 2A and 2B, which are vehicle deceleration downshift speed charts. Briefly, the speed charts illustrated in FIGS. 2A and 2B illustrate the engaged transmission ratio at a specified engine speed and vehicle speed. The shift points obtained by utilizing downshift shift profile 52 are illustrated in solid lines in both FIGS. 2A and 2B. The transmission ratio and engine rotational speed characteristics obtained by utilizing the maximum performance/maximum engine braking downshift profile 50 is illustrated in dotted lines in FIG. 2A, while the transmission ratio and engine rotational speed characteristics obtained by utilizing the coast mode downshift shift profile 54 is illustrated in dotted lines in FIG. 2B.

Referring to FIG. 2A, it may be appreciated that by utilizing the maximum performance/maximum engine compression braking downshift profile 50, and assuming that vehicle speed remains relatively constant during the relatively rapid shift transient, the engine speed at completion of a downshift will be approximately the governed engine speed. As is well known in the prior art, maximum performance and maximum engine braking are obtained in a diesel engine when the diesel engine is operating at or near its maximum governed engine RPM. It is noted that in the lower gear ratios, shift point profile 50 is selected such that the engine RPM at completion of a downshift is somewhat less than maximum governed engine speed to prevent unduly harsh and potentially damaging and dangerous vehicle operation.

Figure 4:
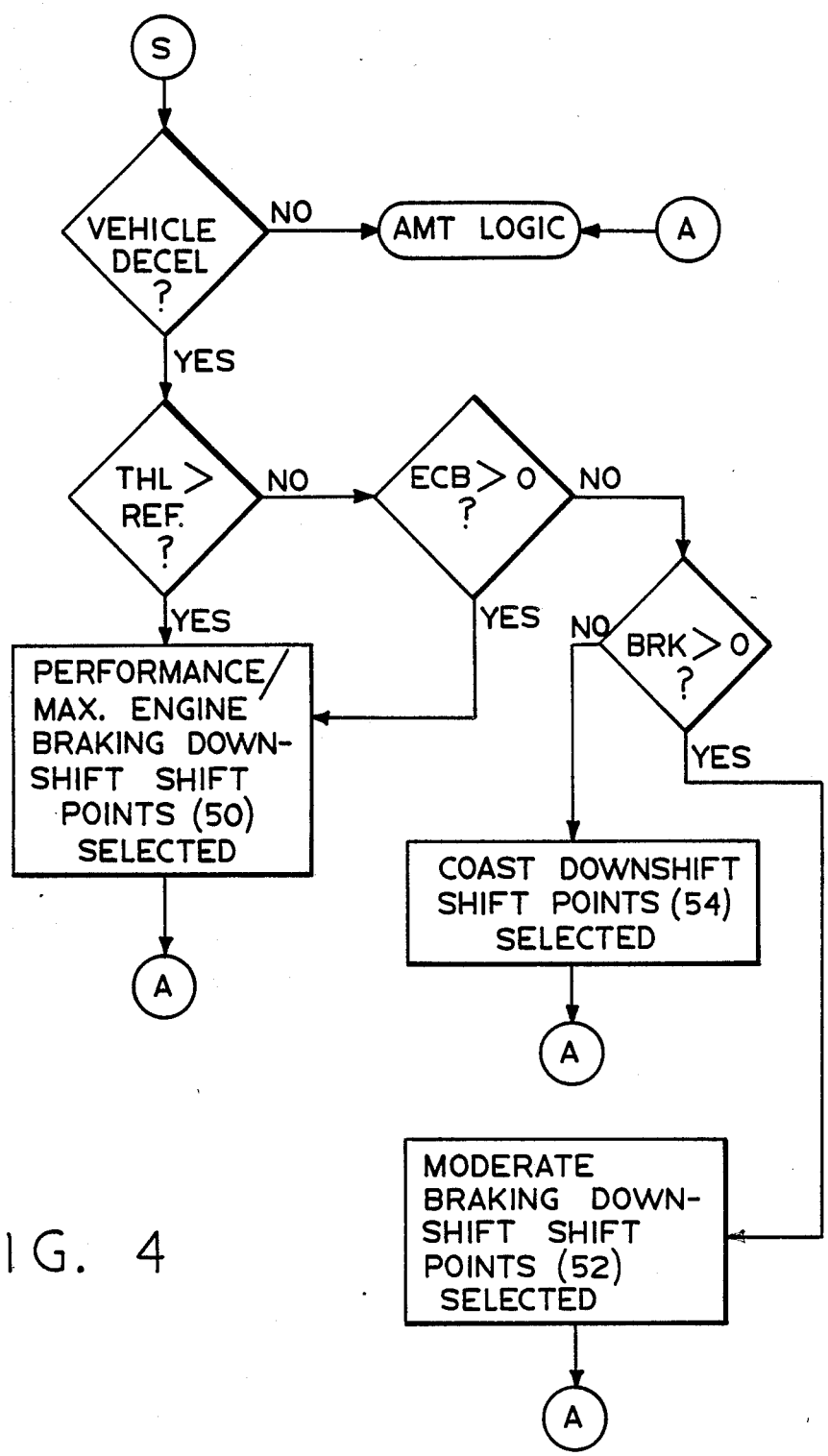
FIG. 4 is a symbolic illustration, in the form of a flow chart, illustrating the preferred manner of practicing the method of the present invention.

Selection of an appropriate vehicle deceleration downshift shift profile 50, 52 or 54, does, of course, require that the logic rules accurately predict the current vehicle deceleration operating conditions and vehicle operator intentions. FIG. 4 schematically illustrates logic rules by which the sensed input parameters may be utilized to predict the current vehicle deceleration/operator intention conditions. Upon a determination that the vehicle is decelerating, as may be obtained by monitoring the signal from transmission output shaft speed sensor 36 and differentiating same, the logic will process input signals from the throttle position sensor 22

(THL), the brake actuator sensor (BRK) and the engine compression brake sensor (ECB).

If the throttle signal (THL) is greater than a predetermined reference signal, which reference signal may be 0% throttle, this is an indication that the vehicle is decelerating due to adverse road conditions, such as operation on a relatively steep hill, and that the operator desires performance. Accordingly, upon sensing a throttle position signal greater than the predetermined reference, the logic will declare a performance required vehicle deceleration condition and the performance/maximum braking downshift shift profile 50 will be utilized. If a signal indicating operator actuation of the engine compression brake (ECB) is received, this is an indication of the operator requiring a maximum braking effort and the logic will declare a maximum braking required vehicle deceleration condition and will utilize the performance/maximum braking downshift shift point profile 50. If the vehicle is decelerating without the presence of a throttle position signal (THL) and without the presence of an engine compression brake (ECB) signal, while a signal indicating operator actuation of the vehicle brakes (BRK) is received, the logic will declare a moderate braking vehicle deceleration condition and the moderate braking downshift shift point profile 52 will be utilized. If the vehicle is decelerating in the absence of all of the throttle position (THL) signal, engine compression brake (ECB) and vehicle brake (BRK) signals, the logic will declare a coasting vehicle deceleration condition and the coasting downshift shift point profiles 54 will be utilized.

Accordingly, it may be seen that by the control, and the control method, of the present invention, predetermined logic rules are provided allowing the central processing unit 42 of an AMT system 10 to process available input parameters to determine if a vehicle deceleration condition exists, and, if such a condition is sensed, to predict the conditions and/or operator intentions causing the vehicle deceleration conditions and to select appropriate downshift shift point profiles in view of the predicted condition.

Although the present invention has been set forth with a certain degree of particularity, it is understood that various modifications are possible without departing from the spirit and the scope of the invention as hereinafter claimed.

I claim:

1. An automatic transmission system (10) for vehicles having a variable rotational speed throttle-controlled engine (14), an operator actuated variable position throttling control means (24), an operator actuated vehicle brake control means (40), an operator actuated engine compression brake (17) and a transmission (12) having a plurality of gear ratio combinations selectively engagable between a transmission input shaft and a transmission output shaft, said transmission system including an information processing unit (42) having means for receiving a plurality of input signals including an input signal indicative of the position of said throttle controlling means (THL), an input signal indicative of the rotational speed of said engine, an input signal indicative of the speed of said vehicle, and an input signal indicative of operation of the vehicle brake control means (BRK), said processing unit including means for processing said input signals in accordance with a program to select a desirable gear ratio for a given combination of input signals and for generating output signals whereby said transmission system is operated in accordance with said program, and means associated with said transmission effective to actuate said transmission (34) to effect engagement of one of said gear ratio combinations in response to said output signals from said processing unit, said system characterized by:

means to receive an input signal indicative of actuation of the engine compression brake (ECB);

said program causing said processing unit to process said input signals in accordance with a first, a second and a third mutually exclusive mode of operation upon sensing vehicle deceleration, the engine speeds (50) at which said processing unit commands downshifts in said first mode of operation exceeding the engine speeds (52) at which said processing unit commands downshifts in said second mode of operation, the engine speeds (52) at which said processing unit commands downshifts in said second mode of operation exceeding the engine speeds (54) at which said processing unit commands downshifts in said third mode of operation; and means to select operation in one of said first, second and third modes of operation, said means to select effective to select operation in said first mode if actuation of said engine compression brake is sensed and the input signal indicative of throttle position exceeds a reference value, said reference value equaling at least zero percent throttle.

2. The system of claim 1, wherein the engine speeds (50) at which said processing unit commands downshifts in said first mode are selected to cause engine speed (56) to be at substantially a maximum allowable value (62) after completion of a commanded downshift at current vehicle speed.

3. The system of claim 2 wherein the engine (14) is a governed diesel engine and said maximum allowable engine speed value is the governed speed of the engine.

4. The system of claim 3, wherein said processing unit commands downshift in said third mode at engine speeds selected to result in an engine speed (60) after completion of the downshift at current vehicle speed which will result in insignificant vehicle engine braking.

5. The system of claim 1, wherein said means to select operation in one of said first, second and third modes will select operation in said second mode if said vehicle brakes are actuated and said throttle position signal does not exceed said reference value and said engine compression brake is not actuated, and will select operation in said third mode if said throttle position signal does not exceed said reference, said engine compressor brake is not actuated and said vehicle brakes are not actuated.

6. The system of claim 5, wherein said reference value equals zero percent throttle.

7. The system of claim 2, wherein said means to select operation in one of said first, second and third modes will select operation in said second mode if said vehicle brakes are actuated and said throttle signal does not exceed said reference value and said engine compression brake is not actuated, and will select operation in said third mode if said throttle signal does not exceed said reference, said engine compressor brake is not actuated and said vehicle brakes are not actuated.

8. The system of claim 3, wherein said means to select operation in one of said first, second and third modes will select operation in said second mode if said vehicle brakes are actuated and said throttle signal does not exceed said reference value and said engine compression brake is not actuated, and will select operation in said third mode if said throttle signal does not exceed said reference, said engine compressor brake is not actuated and said vehicle brakes are not actuated.

9. The system of claim 8, wherein said reference value equals zero percent throttle.

10. A method for controlling a vehicle automatic mechanical transmission system for devices having an operator actuated variable position throttle, a throttle-controlled variable rotational speed engine, an operator actuated vehicle brake control means, a transmission having a plurality of gear ratio combinations selectively engagable between a transmission input shaft and a transmission output shaft, said transmission input shaft being operatively connected to said engine by means of a selectably engagable and disengagable friction coupling, an operator actuated engine compression brake (17), and operator actuated vehicle brakes (40), said automatic mechanical transmission system including an information processing unit (42) having means for receiving a plurality of input signals including an input signal indicative of the rotational speed of the engine; an input signal indicative of the operator's setting of the throttle pedal (THL), an input signal indicative of vehicle speed, an input signal indicative of operation of vehicle brake control means (BRK); said processing unit including means for processing said input signals in accordance with a program for generating output signals whereby said transmission system is operated in accordance with said program, and means associated with said transmission system (34) effective to actuate said transmission system to effect engagement of said gear ratio combinations in response to said output signals from said processing unit, said processing unit having means to sense vehicle deceleration and means to modify the engine speeds at which upshifts and downshifts are commanded, said method characterized by:

receiving an additional input signal comprising an input signal (ECB) indicate of operation of said engine compression brake;

sensing vehicle deceleration and selecting one of a first, second and third mutually exclusive sets of logic rules for determining the engine speeds at which downshifts are commanded during vehicle deceleration, speeds (50) at which said processing unit commands downshifts in said first set of logic rules exceeding the engine speeds (52) at which said processing unit commands downshifts in said second set of logic rules, the engine speeds (52) at which said processing unit commands downshifts in said second set of logic rules exceeding the engine speeds (54) at which said processing unit commands downshifts in said third set of logic rules, selection of one of said first, second and third sets of logic rules comprising selection of operation in said first set of logic rules if said engine compression brake is being actuated and the input signal indicative of throttle position exceeds a reference value having a value of at least zero percent throttle.

11. The method of claim 10, wherein the engine speeds (50) at which said processing unit commands downshifts in said first set of logic rules are selected to cause engine speed (56) to be at substantially a maximum allowable value (62) after completion of a commanded downshift at current vehicle speed.

12. The method of claim 11, wherein the engine (14) is a governed diesel engine and said maximum allowable engine speed is the governed speed of the engine.

13. The method of claim 12, wherein said processing unit commands downshifts in said third mode at engine speeds selected to result in an engine speed (60) after completion of the downshift at current vehicle speed which will result in insignificant engine braking.

14. The method of claim 10, wherein said selection of one of said first, second and third sets of logic rules additionally comprises selecting operation in said second set of logic rules if said vehicle brakes are actuated and said throttle signal does not exceed said reference value and said engine compression brake is not actuated, and selecting operation in said third set of logic rules if said throttle signal does not exceed said reference value, said engine compressor brake is not actuated and said vehicle brakes are not actuated.

15. The method of claim 14, wherein said reference value equals zero percent throttle.

16. The method of claim 11, wherein said selection of one of said first, second and third sets of logic rules additionally comprises selecting operation in said second set of logic rules if said vehicle brakes are actuated and said throttle signal does not exceed said reference value and said engine compression brake is not actuated, and selecting operation in said third set of logic rules if said throttle signal does not exceed said reference value, said engine compressor brake is not actuated and said vehicle brakes are not actuated.

17. The method of claim 12, wherein said selection of one of said first, second and third sets of logic rules additionally comprises selecting operation in said second set of logic rules if said vehicle brakes are actuated and said throttle signal does not exceed said reference value and said engine compression brake is not actuated, and selecting operation in said third set of logic rules if said throttle signal does not exceed said reference value, said engine compressor brake is not actuated and said vehicle brakes are not actuated.

18. The method of claim 16, wherein said reference value equals zero percent throttle.

* * * * *